(12) United States Patent
Hido

(10) Patent No.: US 8,538,169 B2
(45) Date of Patent: Sep. 17, 2013

(54) METHOD, PROGRAM, AND SYSTEM FOR CALCULATING SIMILARITY BETWEEN NODES IN GRAPH

(75) Inventor: Shohei Hido, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 13/093,962

(22) Filed: Apr. 26, 2011

(65) Prior Publication Data

US 2011/0268364 A1 Nov. 3, 2011

(30) Foreign Application Priority Data

Apr. 30, 2010 (JP) ................................. 2010-105065

(51) Int. Cl.
  *G06K 9/00* (2006.01)
  *G06K 9/34* (2006.01)
  *G06K 9/46* (2006.01)
(52) U.S. Cl.
  USPC ........... 382/218; 382/100; 382/180; 382/190; 706/45; 707/798
(58) Field of Classification Search
  USPC ................ 382/218, 181, 190, 209, 215, 173, 382/180, 100, 115, 118, 219, 217, 195, 224, 382/226, 187; 707/999.002, E17.001, E17.011, 707/E17.012, 999.001, 999.003, 999.005, 707/E17.107, E17.108, 705, 736, 737, 798, 707/790, 791, 748, 755, 793, 794; 706/46, 706/52, 54, 45, 62, 12
  See application file for complete search history.

(56) References Cited

U.S. PATENT DOCUMENTS

| | | | | |
|---|---|---|---|---|
| 7,171,060 | B2 * | 1/2007 | Park et al. | 382/305 |
| 7,174,043 | B2 * | 2/2007 | Lossev et al. | 382/187 |
| 7,257,244 | B2 * | 8/2007 | Miga | 382/128 |
| 7,382,921 | B2 * | 6/2008 | Lossev et al. | 382/187 |
| 7,599,902 | B2 * | 10/2009 | Fox et al. | 706/54 |
| 7,979,444 | B2 * | 7/2011 | Ma et al. | 707/748 |
| 8,041,082 | B1 * | 10/2011 | Baluja et al. | 382/118 |

FOREIGN PATENT DOCUMENTS

| | | | |
|---|---|---|---|
| JP | 7155169 | A | 6/1995 |
| JP | 7219759 | A | 8/1995 |
| JP | 2004272352 | A | 9/2004 |
| JP | 2007128389 | A | 5/2007 |
| JP | 2010032919 | A | 2/2010 |

OTHER PUBLICATIONS

Shervashidze, et al., "Fast subtree kernels on graphs", NIPS 2009.
Bunke, "Graph Matching: Theoretical Foundations, Algorithms, and Applications", Montreal, Quebec, Canada, May 2000, pp. 82-88.

* cited by examiner

*Primary Examiner* — Sheela Chawan
(74) *Attorney, Agent, or Firm* — Vazken Alexanian

(57) ABSTRACT

A computer-implemented method, program, and system for calculating similarity between nodes in a graph by computer processing. The method includes: calculating a new label value of a node on the basis of a label value of a node adjacent to the node with respect to each of the nodes in one or more graphs; correcting the new label value of the adjacent node to remove an influence of the label value of a target node with respect to each of the target nodes for the calculation of the similarity between the nodes; and calculating the similarity between the target nodes by using the corrected new label value of the node adjacent to one target node and the corrected new label value of the node adjacent to another target node.

15 Claims, 9 Drawing Sheets

|  | approach in this embodiment | Cos (ID) | Cos (lebel) | SimRank | Augmented SimRank |
|---|---|---|---|---|---|
| Mean similarity (all) | 0.0207 | 0.0058 | 0.2170 | 0.0024 | 0.0101 |
| Mean similarity (selected) | 0.1585 | 0.1573 | 0.3898 | 0.0569 | 0.0821 |
| Mean rank (selected) | 362246 | 1073586 | 1818685 | 1661213 | 540104 |

FIG. 9

METHOD, PROGRAM, AND SYSTEM FOR CALCULATING SIMILARITY BETWEEN NODES IN GRAPH

CROSS-REFERENCE TO RELATED APPLICATIONS

This application claims priority under 35 U.S.C. §119 to Japanese Patent Application No. 2010-105065, filed Apr. 30, 2010, the entire contents of which are incorporated by reference herein.

BACKGROUND OF THE INVENTION

1. Field of the Invention

The present invention generally relates to an information processing technology, and particularly to a method, program, and system for calculating similarity between nodes in a graph.

2. Description of the Related Art

A graph is a mathematical object made up of vertices (sometimes called nodes), edges (sometimes called branches, or links) joining some or all of the vertices. The nodes and edges in the graph can be labeled to be identified.

An actual object such as a road map or a chemical formula can be represented by a graph. For example, in the road map, an intersection and a road can be considered to be a node and an edge, respectively. In the chemical formula, an atom and coupling between atoms can be considered to be a node and an edge, respectively. It is understood that a graph is applicable to a wide range, including genes, protein structures, electric circuits, geography, and architecture.

In recent years, a graph structure begins to be applied to a representation of social networking service (SNS). Specifically, a specific state of SNS can be represented by a graph by assuming individual SNS users to be nodes and friendship between the users to be edges. Similarly, it is to be understood by those skilled in the art that the link structure of the World Wide Web (WWW) can be represented by a graph.

When an actual object is represented by a graph, it is often necessary to evaluate similarity between nodes in the graph. Some examples include evaluating whether a known medicine reacting to proteins in a living organism is similar to a medicine under development and to predict whether the new medicine reacts to the proteins in the living organism. In this case, the evaluation will be achieved by calculating similarity between a node associated with the known medicine and a node associated with the new medicine in a graph representing the proteins and the medicines.

As background art, a method is disclosed for displaying and extracting highly similar regions on the basis of a sequence alignment result selected as local similar sequences in biopolymers made of constituent sequences and a device thereof. The method includes calculating an alignment result of sequences having the local similar sequences by using a dynamic programming approach or the like. The alignment result is obtained as a graph, with a first axis as the element number denoting the order of a base or amino acid that is an element of one of aligned sequences and a second axis as the cumulative value of scores up to the element number, and the graph is displayed. In highly similar regions, the slope of the graph is steep. (See Japanese Patent Application Publication No. H07-155169, "JP7155169".)

As another background art, a communication software development support device is disclosed for efficiently developing highly reliable communication software. The device includes: a unit for interpreting the specification of a function described and added in processes of communication software development and generating a first graph representing a state transition relation composed of a state and a signal generated at the time of performing communication processing; a unit for interpreting the specification of an automatically retrieved function having already been developed and generating a second graph representing a state transition relation composed of a state and a signal generated at the time of performing communication processing; a unit for calculating similarity between the first graph and the second graph; a unit for selecting the graphs in descending order of the calculated similarity; and a unit for displaying the specifications of the developed functions corresponding to the selected graphs, where reusable functions having already been developed are presented to a person defining specification in descending order of reusability. (See Japanese Patent Application Publication No. H07-219759, "JP7219759".)

As still another background art, a similarity calculation device is disclosed for enabling similarity between texts to be easily calculated with the structures of the texts reflected. The similarity calculation device includes: a morphological analysis section for performing morphological analysis on the text; a clause analysis section for composing a clause; a dependency analysis section for deciding dependency associated with the clause; a non-circular directed graph generation section for generating a non-circular directed graph with the hierarchy corresponding to the text to be processed being permitted on the basis of a result of the morphological analysis, a result of the composition of the clause, and a result of the analysis of the dependency; and a similarity calculation section for calculating similarity between the non-circular directed graphs and outputting the calculated similarity as similarity between texts. The similarity between the non-circular directed graphs is determined as the total sum of the number of matched partial paths in all the partial paths in the non-circular directed graph. Preferably, the similarity is calculated by a recursive formula. (See Japanese Patent Application Publication No. 2004-272352, "JP2004272352A".)

As further another background art, a word class creation program is disclosed that is capable of creating a group of the same class words according to a target document very reliably without preparing a word thesaurus for a set of terms appearing in the target document. In the program, similarity is calculated with respect to a combination of extracted terms; a pair of terms composed of two terms are sorted on the basis of the similarity; a graph is created by expressing a combination relation with an edge with each term as a node with respect to the selected pair of terms; candidates for a dichotomy pattern of the graph obtained by severing a predetermined edge are extracted; a graph is divided on the basis of an average edge density calculated from the respective candidates; and terms in a configuration node of each of a plurality of graphs in a division result are extracted as a term group of the same class. (See Japanese Patent Application Publication No. 2007-128389, "JP2007128389".)

As further still another background art, a graph integration device is disclosed having a simple structure, capable of treating a plurality of integration graphs with less computational complexity. The device is configured to receive inputs of a plurality of input graphs G each including nodes representing input elements and an edge representing a branch and combination between the nodes and to integrate the input graphs G. The device includes: a graph input unit; an input graph storage unit; a similarity calculation unit for calculating similarity between input graphs G by DP matching; a similarity determination unit for determining whether the input graphs G are similar to each other on the basis of the similarity; a graph integration unit for integrating the input graphs G if the input graphs G are similar to each other; a graph addition unit for adding each of the input graphs G as a new integration graph unless the input graphs G are similar to each other; and an integration graph storage unit. (See Japanese Patent Application Publication No. 2010-032919, "JP2010032919".)

As still another background art, literature entitled "Fast subtree kernels on graphs" discloses as follows: "We propose fast subtree kernels on graphs. On graphs with n nodes and m edges and maximum degree d, these kernels comparing subtrees of height h can be computed in O(mh), whereas the classic subtree kernel by Ramon & G"artner scales as $O(n^2 4^d h)$. Key to this efficiency is the observation that the Weisfeiler-Lehman test of isomorphism from graph theory elegantly computes a subtree kernel as a byproduct. Our fast subtree kernels can deal with labeled graphs, scale up easily to large graphs and outperform state-of-the-art graph kernels on several classification benchmark datasets in terms of accuracy and runtime." (See Nino Shervashidze and Karsten M. Borgwardt, "Fast subtree kernels on graphs", NIPS 2009.)

As further another background art, literature entitled "Graph Matching: Theoretical Foundations, Algorithms, and Applications" discloses as follows: "Graphs are a powerful and versatile tool useful in various subfields of science and engineering. In many applications, for example, in pattern recognition and computer vision, it is required to measure the similarity of objects. When graphs are used for the representation of structured objects, then the problem of measuring object similarity turns into the problem of computing the similarity of graphs, which is also known as graph matching. In this paper, similarity measures on graphs and related algorithms will be reviewed. Applications of graph matching will be demonstrated giving examples from the fields of pattern recognition and computer vision. Also recent theoretical work showing various relations between different similarity measures will be discussed." (See Horst Bunke, "Graph Matching: Theoretical Foundations, Algorithms, and Applications", Montreal, Quebec, Canada, May 2000, pp. 82-88.)

SUMMARY OF THE INVENTION

According to an aspect of the present invention, a computer-implemented method is provided for calculating similarity between nodes in one or more graphs that are displayable on a computer display. The method includes: calculating a new label value of a node on the basis of the label value of at least one node adjacent to the node with respect to each of the nodes in one or more graphs; correcting the new label value of the adjacent node to remove an influence of the label value of a target node with respect to each of the target nodes for the calculation of the similarity between the nodes; and calculating the similarity between the target nodes by using the corrected new label value of the node adjacent to one target node and the corrected new label value of the node adjacent to another target node.

According to another aspect of the present invention, a computer-implemented system is provided for calculating similarity between nodes in one or more graphs that are displayable on a computer display. The system includes: a graph data creation section for calculating a new label value of a node; a label value correction section for correcting the new label value of the adjacent node; and a node similarity calculation section for calculating the similarity between the two or more nodes.

According to a further aspect of the present invention, an article of manufacture tangibly embodying computer readable instructions, which when implemented, causes a computer system to carry out the steps of the method of the present invention.

BRIEF DESCRIPTION OF THE DRAWINGS

FIG. 9 is a diagram illustrating an example of an advantageous effect of one embodiment of the present invention.

DETAILED DESCRIPTION OF THE PREFERRED EMBODIMENTS

Figure 1:
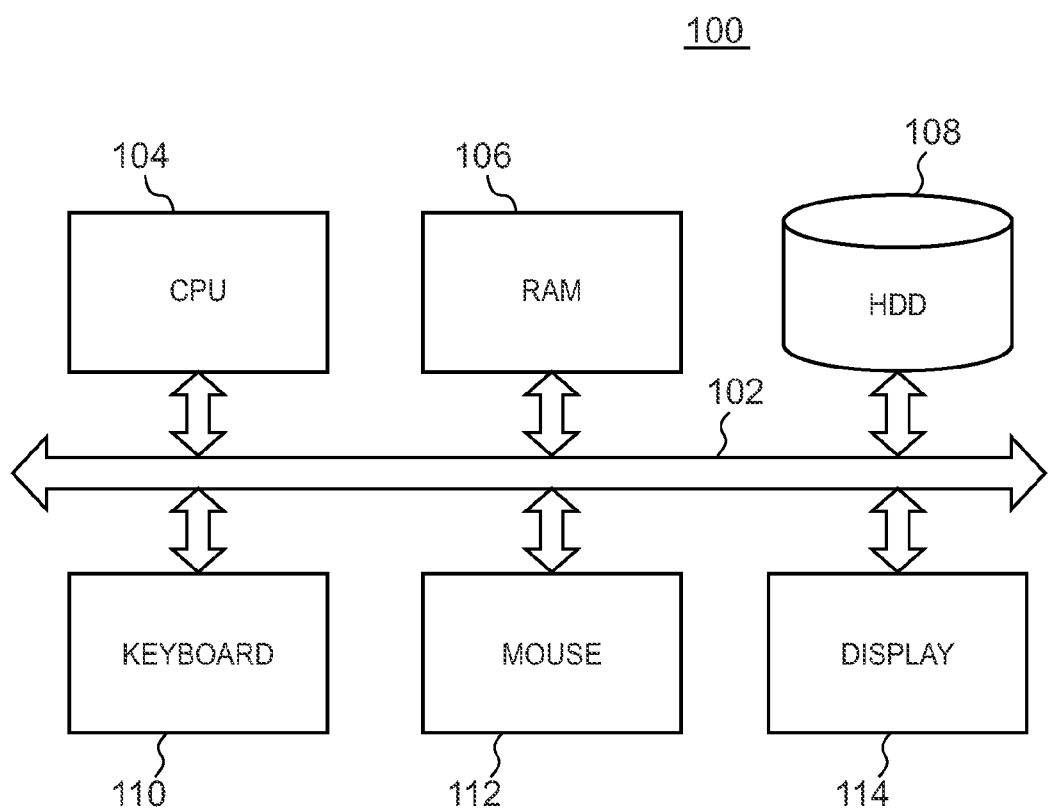
FIG. 1 is a block diagram of preferable hardware of a computer system for performing processing according to one embodiment of the present invention.

Hereinafter, preferred embodiments of the present invention will be described in detail in accordance with the accompanying drawings. Unless otherwise specified, the same reference numerals denote the same elements throughout the drawings. It is to be understood that the following description is merely of one embodiment of the present invention and is not intended to limit the present invention to the contents described in the preferred embodiments.

In calculating the similarity between nodes in a graph, a solution is obtained in reasonable computation time as long as the graph includes relatively less number of nodes and edges. If the graph is large in size, however, the computation sometimes significantly exceeds the range that can be treated with a realistic computational amount by using a delicate internode similarity calculation technique. For example, in bioinformatics where gene sequences are treated, the number of nodes is sometimes very large, such as thousands to tens of thousands of nodes or, in the case of SNS, millions of nodes. The embodiments of the present invention provide an improved method, program, and system for calculating similarity between nodes in a graph by computer processing.

Referring to FIG. 1, a block diagram illustrates preferable hardware of a computer system for performing processing according to one embodiment of the present invention. In FIG. 1, a system bus 102 is connected to a CPU 104, a main memory (RAM) 106, a hard disk drive (HDD) 108, a keyboard 110, a mouse 112, and a display 114. The CPU 104 is preferably based on a 32-bit or 62-bit architecture, and it is possible to use other CPUs such as, for example, Intel Pentium™ 4/Core™ 2 Duo/Xeon™ or AMD Athlon™. The main memory 106 preferably has a capacity of 2 GB or more. It is desirable that the hard disk drive 108 has a capacity of, for example, 320 GB or more so as to be able to store a great deal of graph data.

The hard disk drive 108 previously stores an operating system, though not individually illustrated. The operating system may be an arbitrary one compatible with the CPU 104, such as Linux™, Microsoft Windows XP™ or Windows™ 2000, or Apple Computer Mac OS™.

The hard disk drive 108 also stores a programming language processor such as C, C++, C#, and Java™. This programming language processor is used to create and retain modules or tools for graph data processing described later.

The hard disk drive 108 may further include a text editor for writing source codes to be compiled by the program language processor and a development environment such as Eclipse™.

The keyboard 110 and the mouse 112 are used to initiate the operating system or a program (not illustrated), which is loaded into the main memory 106 from the hard disk drive 108 and displayed on the display 114, and to type characters.

The display 114 is preferably a liquid crystal display, and one having an arbitrary resolution such as, for example, XGA (1024×768 resolution) or UXGA (1600×1200 resolution), can be used. The display 114 is used to display graph data to be processed and similarity in a graph, though not illustrated.

Figure 2:
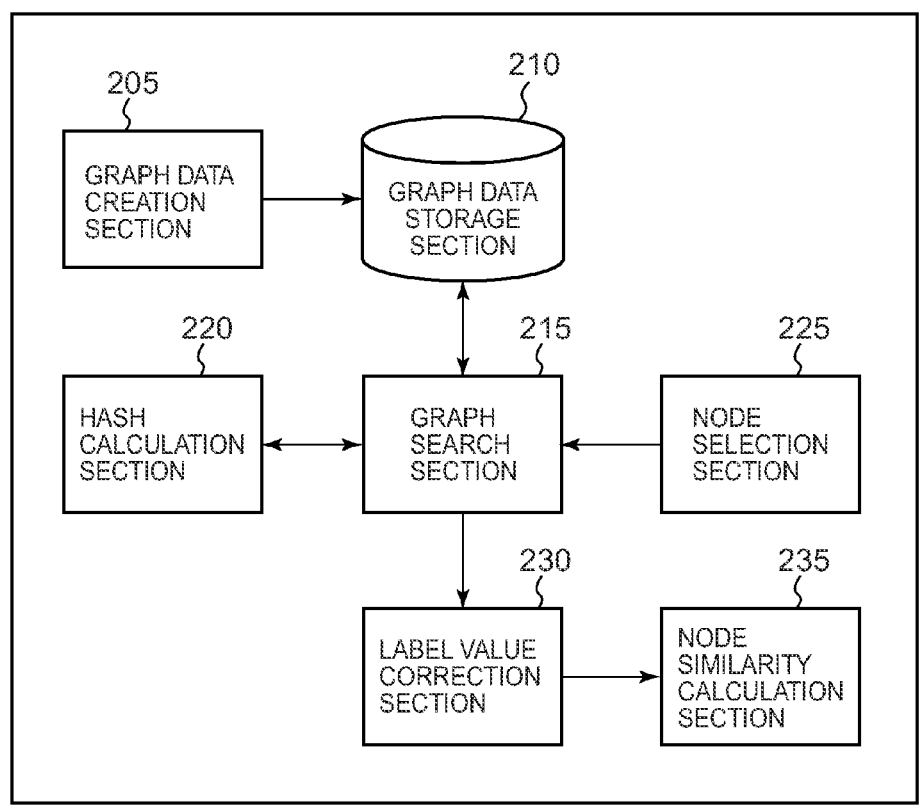
FIG. 2 is a functional block diagram of a computer system according to one embodiment of the present invention.

FIG. 2 is a functional block diagram of a computer system 100 according to one embodiment of the present invention. These functional blocks are each written in an existing programming language such as C, C++, C#, or Java™ and are stored in the hard disk drive 108 in an executable binary format. The functional blocks can be implemented by the cooperation of hardware resources and software by using a program module loaded into the main memory 106 and executed by the action of the operating system (not illustrated) in response to an operation of the mouse 112 or the keyboard 110.

The computer system 100 includes a graph data creation section 205, a graph data storage section 210, a graph search section 215, a hash calculation section 220, a label value correction section 230, and a node similarity calculation section 235.

The graph data creation section 205 converts a given graph to a computer-readable data structure. According to one embodiment of the present invention, the data structure described below is used for a graph g with n as the number of nodes and d as an average number of adjacent nodes. It is to be noted, however, that the data structure used to embody the present invention is not limited thereto.

g.nodelist: A list with a length n representing a node list g.nodelabellist: A list with a length n representing a node label list g.nodelabellistx: A list with a length n having the same data structure as g.nodelabellist and used as a buffer for label writing g.adjacencymatrix: A graph adjacency matrix. The matrix element (i, j) has a value of 1 if a link exists between nodes i and j. Otherwise, the matrix element (i, j) has a value of 0. While the matrix size is n×n, the size is able to be reduced to n×d by using a data structure called "sparse matrix" with 0 elements omitted.

g.edgelabelmatrix: A matrix with n×n where n is the length representing an edge label list. The matrix element (i, j) has an edge label value if a link exists between nodes i and j. Otherwise, the matrix element (i, j) has a value of 0. While the matrix size is n×n, the size is able to be reduced to n×d by using a data structure called "sparse matrix" with 0 elements omitted.

The graph data storage section 210 stores graph data created by the graph data creation section 205. Specifically, the graph data is loaded into the main memory 106 or stored in the hard disk drive 108. If the graph data is very large, it is possible to store the graph data in the hard disk drive 108, first, and then to load only data of parts necessary for calculation into the main memory.

The graph search section 215 sequentially searches for graphs, visits all nodes of one of the graphs, refers to the label values of nodes adjacent to the currently visited node (sometimes referred to as "local node") and the label values of the edges, and passes the label values to the hash calculation section 220. Thereafter, the graph search section 215 receives a new label value of the local node as a result of the hash calculation from the hash calculation section 220 and performs processing of transmitting the new label value to the graph data storage section 210. Moreover, the graph search section 215 is able to perform processing of passing the label value of a target node and new label values of nodes adjacent to the target node from the graph data storage section 210 to the label value correction section 230.

The hash calculation section 220 is able to receive the label values of the nodes adjacent to the local node and the label values of the edges connected to the local node from the graph search section 215, to perform a hash calculation (described in detail later), and to pass the new label value as a result of the calculation to the graph search section 215.

In a node selection section 225, a user or any other system selects two or more target nodes for similarity calculation. The selection information on the target nodes is passed to the graph search section 215.

The label value correction section 230 is able to perform processing of correcting the new label values of the adjacent nodes so as to remove the influence of the label value of the target node concerned with respect to each of two or more target nodes for similarity selected by the node selection section 225. The corrected new label values of the adjacent nodes are passed to the node similarity calculation section 235 to calculate similarity between two or more target nodes.

The node similarity calculation section 235 receives the corrected new label values of the nodes adjacent to the two or more target nodes for the similarity calculation from the label value correction section 230 and calculates similarity between the two or more target nodes on the basis of the new label values. In one embodiment of the present invention, the calculation of similarity between nodes is performed by calculating a Jaccard coefficient (the details thereof will be described later).

Figure 3:
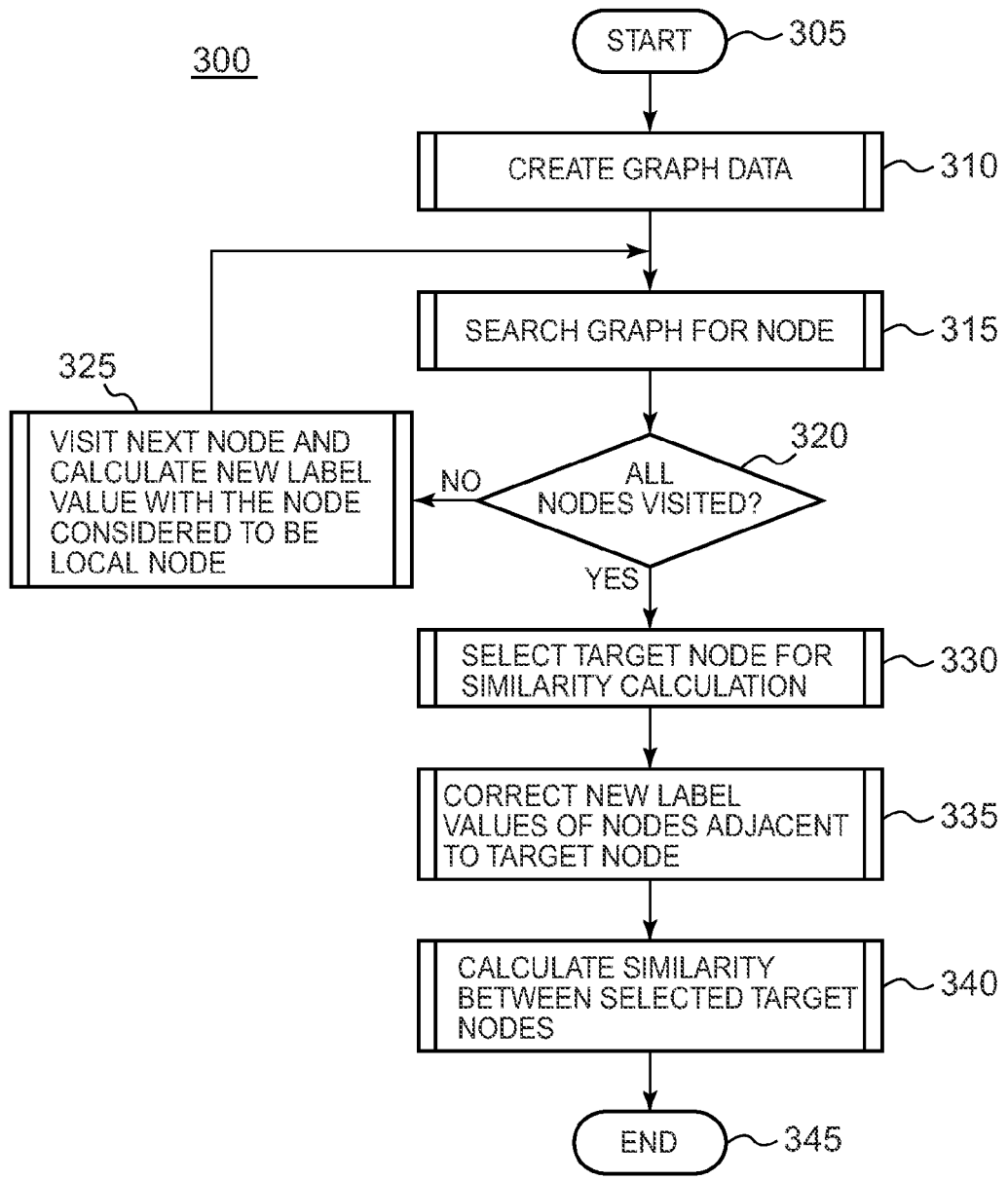
FIG. 3 is a flowchart representing the entire operation of a data processing system according to one embodiment of the present invention.

FIG. 3 is a flowchart 300 representing the entire operation of a data processing system according to one embodiment of the present invention. The processing starts in step 305. In step 310, graph data including nodes and edges is created. Label values are given to the nodes and edges, respectively. In one embodiment of the present invention, the graph data creation section 205 in FIG. 2 performs this process.

In step 310, assuming that p is the number of different label types of nodes, m satisfying $p \ll 2^m$ is selected and a label is assumed to be m-bit data. The reason why $2^m$ is set to be sufficiently greater than p is to reduce the likelihood of a hash collision in labels.

Further, for example, if $LH_i$ is assumed to be the ith label value with preparing a prime number P1 satisfying $2^{(m-1)} < P1 < 2^m$ and a prime number P2 sufficiently greater than P1, different m-bit label values are able to be given to respective labels $L_i$ (i=1, - - - , p) by the following formula:

$$\text{for } (i=1; i \leq p; i++)\{$$

$$LH_i = (P2 * i) \% P1;$$

$$\}$$

where % is an operator for calculating a remainder of a division. It is to be noted that any other random number generation routine is also usable.

Figure 6:
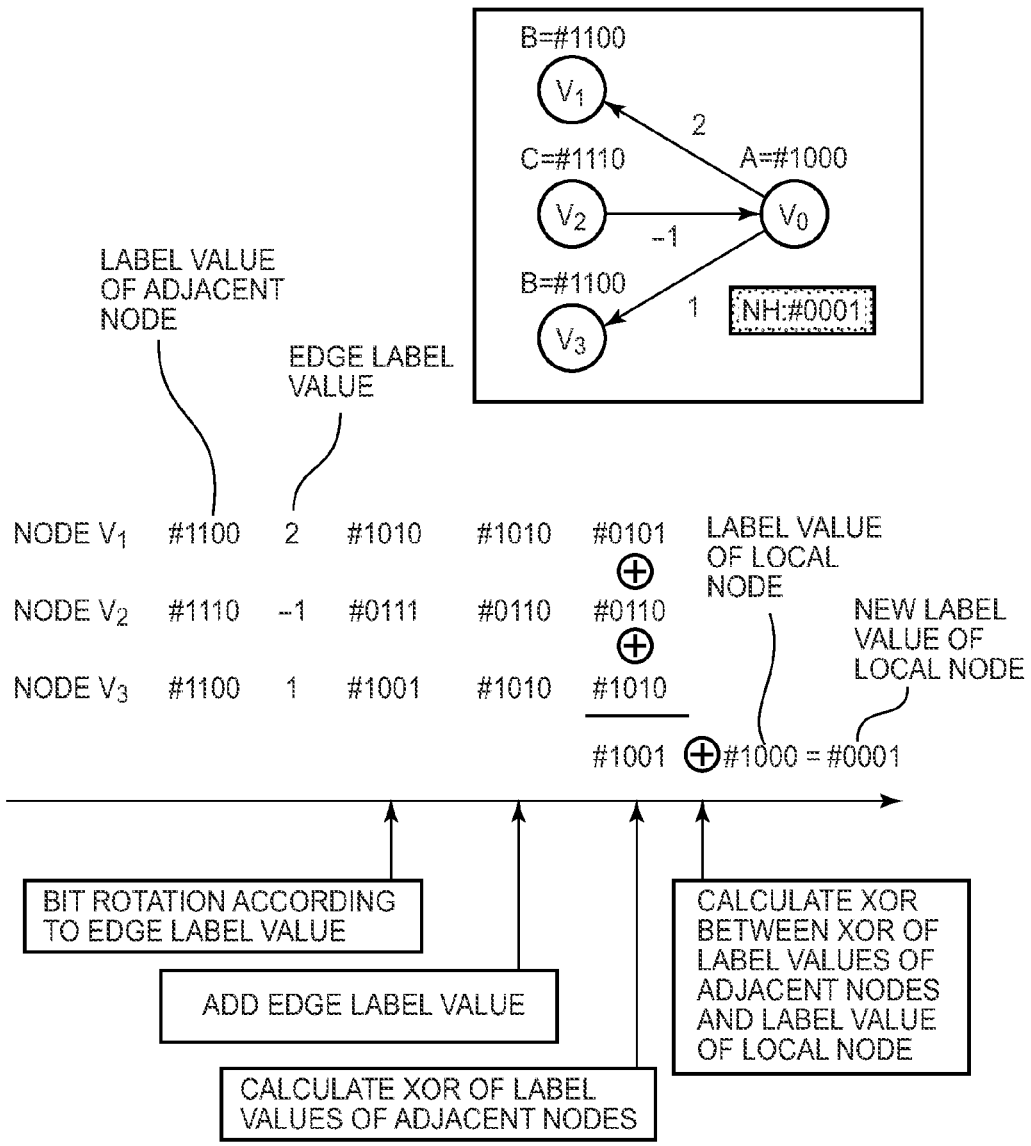
FIG. 6 is a diagram illustrating a concrete calculation example of the processing in FIG. 5.

In step 310, graph data is created while giving the label value LHi determined as described above to each node in the graph according to the label Li. Specifically, the graph data creation section 205 sequentially creates the list "g.nodelist" while following the graph a part of which is illustrated in FIG. 6, for example, with a depth-first search and records the adjacency relation in the matrix "g.adjacencymatrix" while recording the label value LHi in the list "g.nodelabellist." As a result, a bit string is given as a label value to each label. In the example of FIG. 6, A=#1000, B=#1100, and C=#1110. Here, it is assumed that the notation such as #1000 with "#" appended at the beginning represents a binary number preceded by a "#" (sharp) sign. The label value is preferably represented by a fixed number of bits for convenience in calculating a bit rotation or an XOR described later.

Moreover, in step 310, a label value is given to an edge. According to one embodiment of the present invention, the edge label value is used for a bit rotation or the like and therefore preferably the edge label value is represented by the number of digits less than the number of digits of the node label value. Specifically, if q is the number of edge types, numbers 1, 2, 3, - - -, q are recommended to be allocated to the respective edges according to the edge type. According to one embodiment of the present invention, a positive or negative number is given to the label value of an edge according to the direction of the edge.

The processing proceeds to step 315 to search the graph for a node. Next, in step 320, it is determined whether all nodes in the graph have been visited. Specifically, this determination is made by determining whether the end of the list "g.nodelist" is reached.

If it is determined that all nodes in the graph have not been visited yet in step 320, the processing proceeds to step 325 from the arrow NO. In step 325, a graph search module 206 visits the next node by following the list "g.nodelist." In the initial step in the graph search, the graph search module 206 visits the first node in step 325. According to one embodiment of the present invention, the graph search section 215 in FIG. 2 performs these processes.

Further, in step 325, a new label value of the local node (referred to as "new label value") is calculated by hashing using the label values of the nodes adjacent to the currently visited node ("local node"), the label values of the edges connected to the local node, and the label value of the local node. According to one embodiment of the present invention, the hash calculation section 220 in FIG. 2 performs these processes. Here, the term "adjacent nodes" means nodes directly connected to the node concerned via edges. This type of adjacency relation is able to be checked by referring to the values recorded in the matrix "g.adjacencymatrix." These label values are able to be obtained by referring to the list "g.nodelabellist" and the matrix "g.edgelabelmatrix."

The new label value calculated in step 325 is stored, as the new label value of the node, into the graph data storage section 210. In this case, the new label is preferably written into the list "g.nodelabellistx," instead of the list "g.nodelabellist." That is because the result changes depending on the node search order if the list "g.nodelabellist" is directly overwritten and there is a possibility of later using the label value used for calculating the new label value stored in the list "g.nodelabellist."

Figure 4:
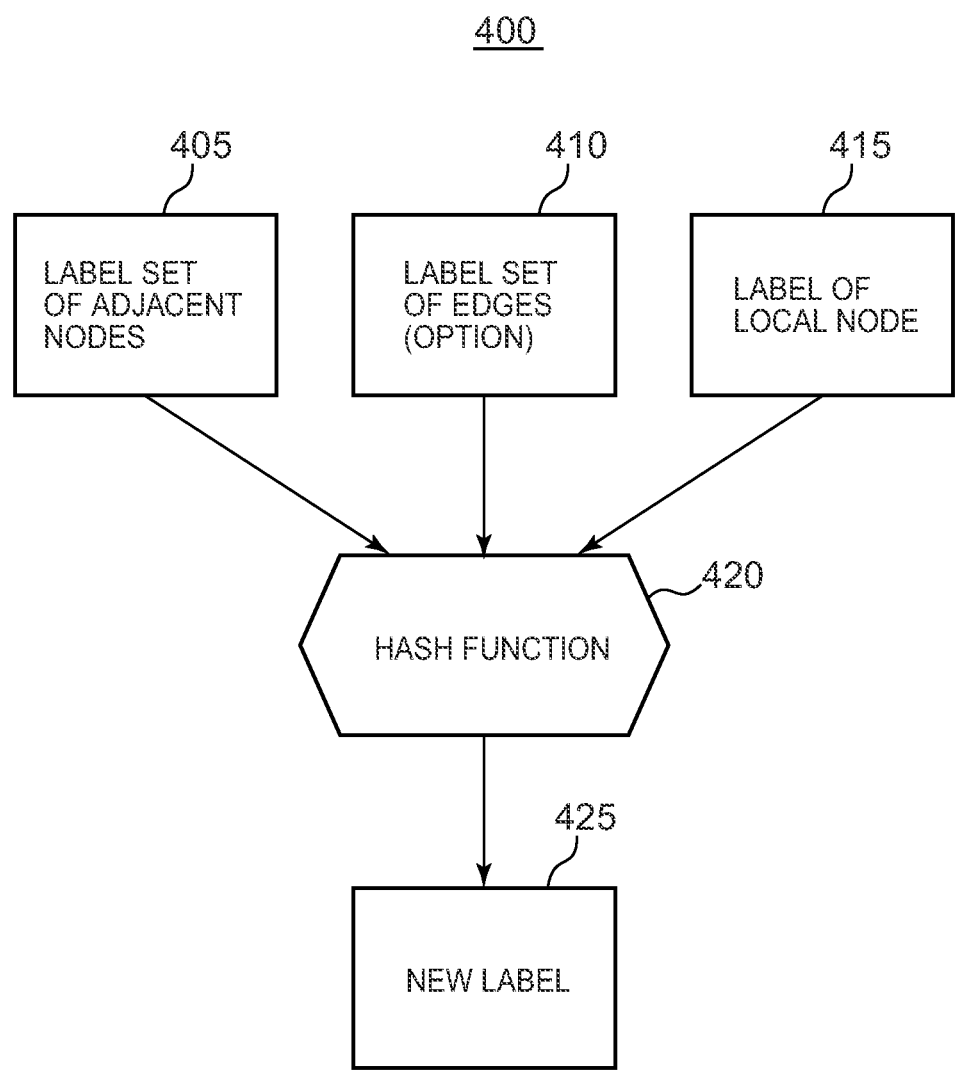
FIG. 4 is a flowchart illustrating hash calculation processing in more detail according to one embodiment of the present invention.

Hereinafter, the calculation of the label value will be described in detail with reference to FIGS. 4 and 5. FIG. 4 is a flowchart illustrating the hash calculation processing in more detail according to one embodiment of the present invention.

In the flowchart of FIG. 3, the currently-visited node is referred to as the local node when the nodes are visited. First, a label set 405 of the nodes adjacent to the local node is able to be obtained from the list "g.nodelabellist" by referring to the values recorded in the matrix "g.adjacencymatrix." Generally, multiple label sets of the nodes adjacent to the local node exist and therefore can be represented by NeighboringNodeLabels[ ].

A label set 410 of edges connected to the local node is obtained from the matrix "g.edgelabelmatrix" by referring to the values recorded in the matrix "g.adjacencymatrix." Multiple edge label sets 410 also generally exist and therefore can be represented by ConnectedEdgeLabels[ ].

A local node label 415 is a label value corresponding to the currently visited node and is obtained from the list "g.nodelabellist." Here, the local node label 415 is represented by ThisNodeLabel.

Assuming that Hash( ) is a hash function 420 and NewLabel is a new label 425, NewLabel is calculated by the formula described below. The value of NewLabel calculated in this manner is written as the new label value of the local node into the list "g.nodelabellistx."

NewLabel=Hash(ThisNodeLabel,NeighboringNodeLabels[ ],ConnectedEdgeLabels[ ])

Figure 5:
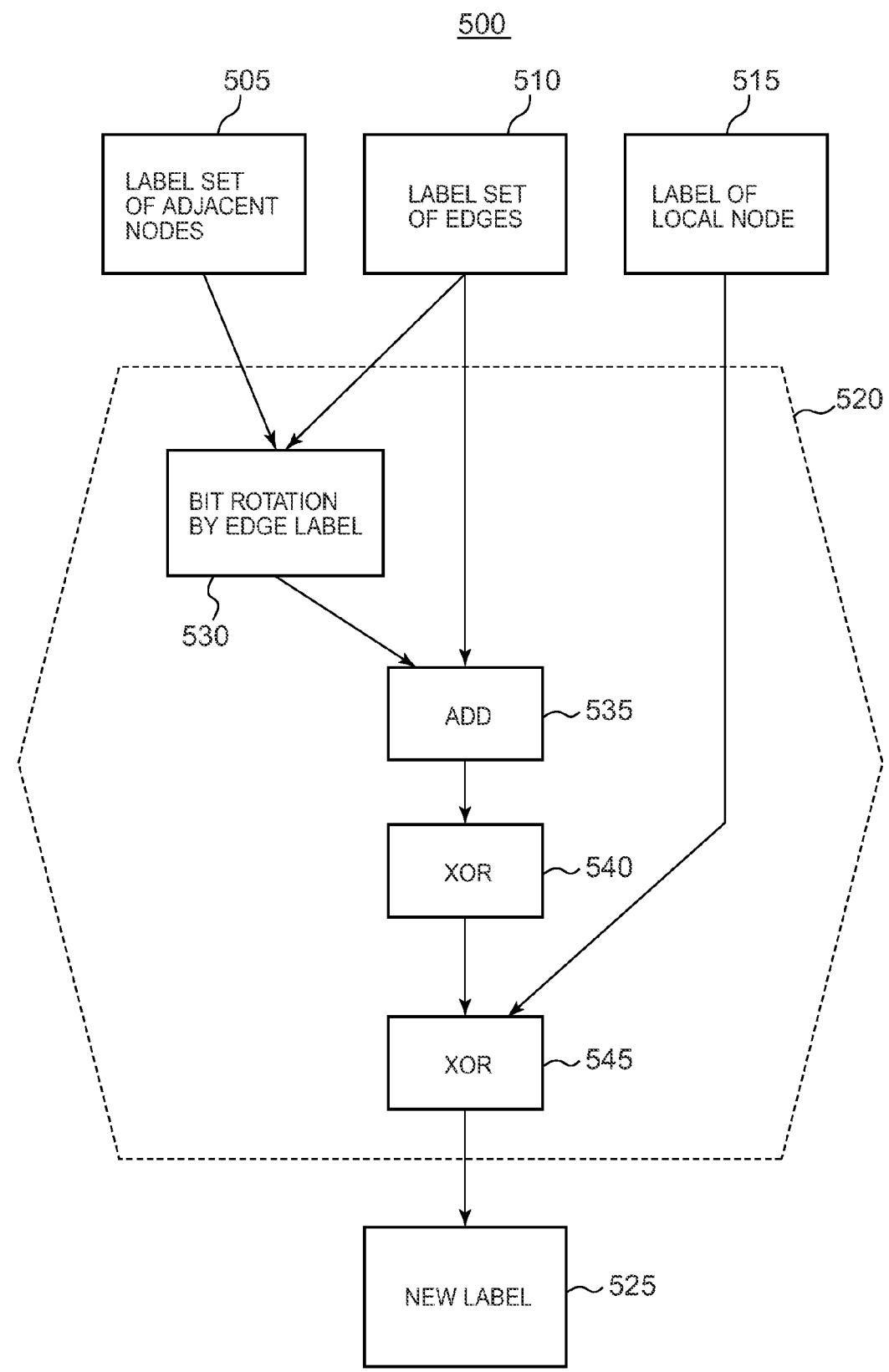
FIG. 5 is a diagram illustrating an embodiment of the processing in FIG. 4.

FIG. 5 is a diagram illustrating an embodiment of the present invention of the processing in FIG. 4. FIG. 5 includes a hash calculation block 520 for creating a new label 525 from a label set of the adjacent nodes 505, a label set of the connected edges 510, and a label of the local node 515.

The hash calculation block 520 includes a block 530 for performing a bit rotation of the label set of the adjacent nodes 505 by the number of bits of the label values of the corresponding edges (connecting each adjacent node and the local node), a block 535 for adding the label values of the corresponding edges to the label set of the adjacent nodes 505, which has been subjected to the bit rotation, a block 540 for calculating an exclusive OR (XOR) of the label set of the adjacent nodes 505, which has been subjected to the bit rotation and the addition, and a block 545 for calculating an XOR between the XORed label set of the adjacent nodes 505 and the label value of the local node.

FIG. 6 illustrates a concrete calculation example of the processing of FIG. 5. In FIG. 6, it is assumed that the label of the local node $v_0$ is #1000, the labels of the adjacent nodes $v_1$, $v_2$, and $v_3$ are #1100, #1110, and #1100, respectively, and the label values of the corresponding edges are 2, −1, and 1, respectively. It is to be noted that the positive and negative signs of the edges represent the directions of the edges.

First, the outputs of the bit rotation in the block 530 are #0011, #0111, and #1001. Then, in the block 535, the label values of the edges are added and the outputs are #0101, #0110, and #1010. In the block 540, the XOR is calculated and the output is #1001. Further in the block 545, the XOR is calculated between the output #1001 and the label value #1000 of the local node, and the new label value (NH) of the local node $v_0$ is eventually #0001.

It is to be noted that the algorithm for calculating the label value of the local node by hashing is not limited to the algorithm illustrated in FIGS. 5 and 6, but an arbitrary hash algorithm is able to be used as long as it requires only an appropriate computational amount and is unlikely to cause a hash collision.

Returning to FIG. 3, the new label value is calculated in step 325 and then the processing returns to step 320. Until all nodes are visited, steps 315, 320, and 325 are performed. The completion of visiting all nodes means that the new label values have been calculated for all nodes in the list "g.nodelist."

The above calculation processing of the new label values by visiting the graph may be performed a plurality of number of times. In this case, it is recommended that g.nodelabellist is replaced with g.nodelabellistx. The rewriting of the label values by visiting the graph is performed for all of one or more graphs including target nodes for which similarity is to be calculated. Moreover, it is to be noted that although the accuracy of a graph comparison generally increases by calculating new labels a predetermined number of times, yet the accuracy does not always increase as the number of times increases, and there will be an optimum number of times.

If it is determined that all nodes of the graph have been visited in step 320, the processing proceeds to step 330 from the arrow YES. In step 330, two or more nodes to be a target (referred to as "target nodes) of the calculation of similarity between nodes are selected. Although this process is performed by the node selection section 225 in FIG. 2 in one embodiment of the present invention, specifically the process is performed on the basis of the input from the user of the computer system 100 or from any other system.

The processing proceeds to step 335 to perform a correction process for removing an influence of the label value of the target node from the new label values (generated in step 325) of the nodes adjacent to the target node. The label value correction section 230 in FIG. 2 performs this process. Specifically, the influence of the label value of the target node is removed from the new label values of the adjacent nodes by calculating the XOR of each of the new label values of the adjacent nodes and the label value of the target node.

Figure 7:
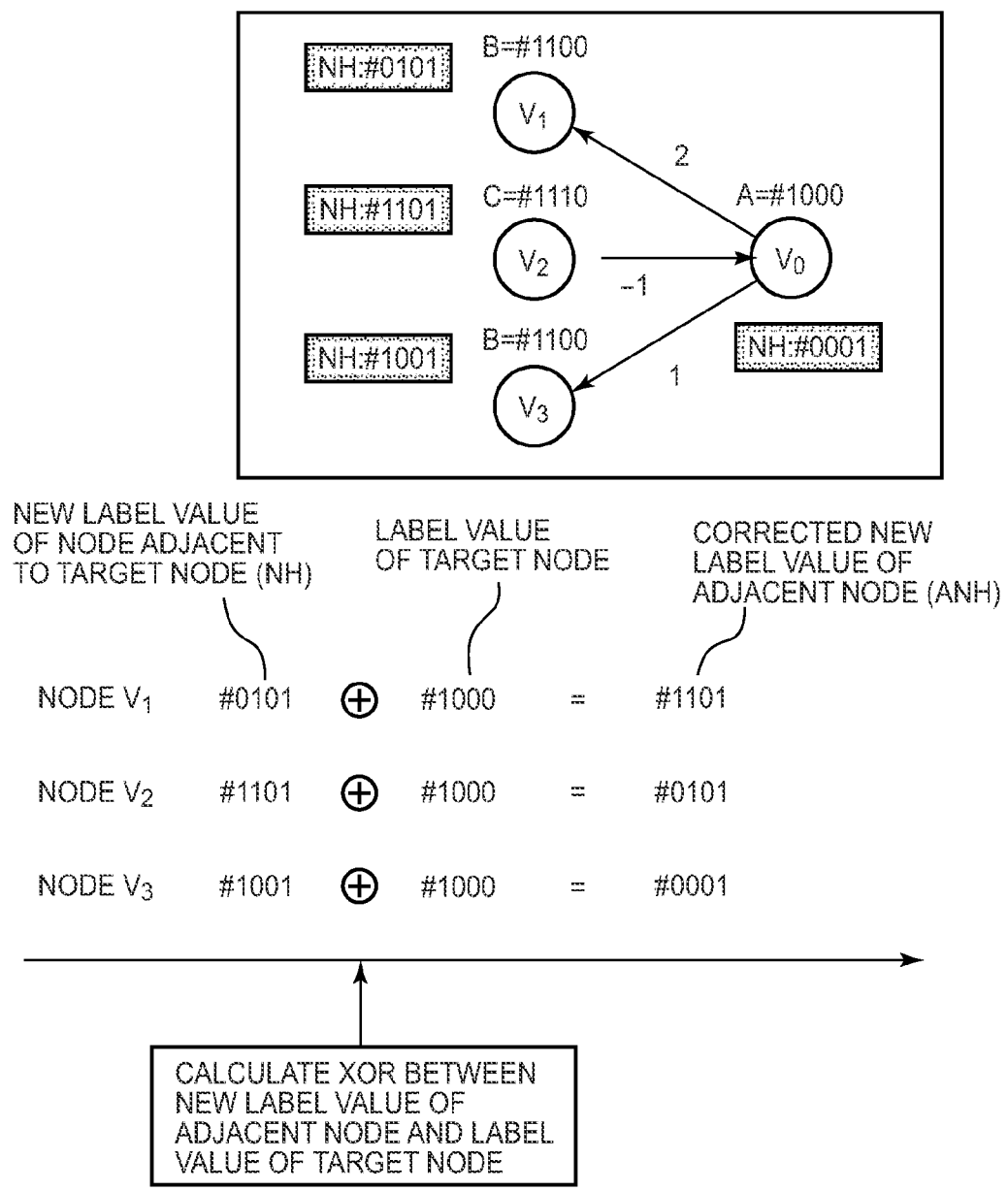
FIG. 7 is a diagram illustrating a concrete calculation example of a correction process of new label values of adjacent nodes according to one embodiment of the present invention.

FIG. 7 illustrates a concrete calculation example of a correction process of new label values. In FIG. 7, it is assumed that the label of the target node $v_0$ is #1000 and the new label values (a result of the process in step 325) of the adjacent nodes $v_1$, $v_2$, and $v_3$ are #0101, #1101, and #1001, respectively. In this case, the corrected new label values (ANH) of the adjacent nodes $v_1$, $v_2$, and $v_3$ are #1101, #0101, and #0001, respectively.

Returning to FIG. 3, the processing proceeds to step 340 to perform the calculation of similarity between selected target nodes by using the new label values corrected in step 335. In one embodiment of the present invention, similarity between nodes is assumed to be calculated by determining the well-known Jaccard Coefficient described below. In other words, with respect to a set of the new label values of the nodes adjacent to one target node (A) and a set of the new label values of the nodes adjacent to another target node (B), the similarity is calculated by dividing the number of elements of the intersection of sets A and B (|A∩B|) by the number of elements of the union of sets A and B. In one embodiment of the present invention, a node similarity calculation section 235 in FIG. 2 performs this process.

$$J(A, B) = \frac{|A \cap B|}{|A \cup B|} \quad [\text{Eq. 1}]$$

Figure 8:
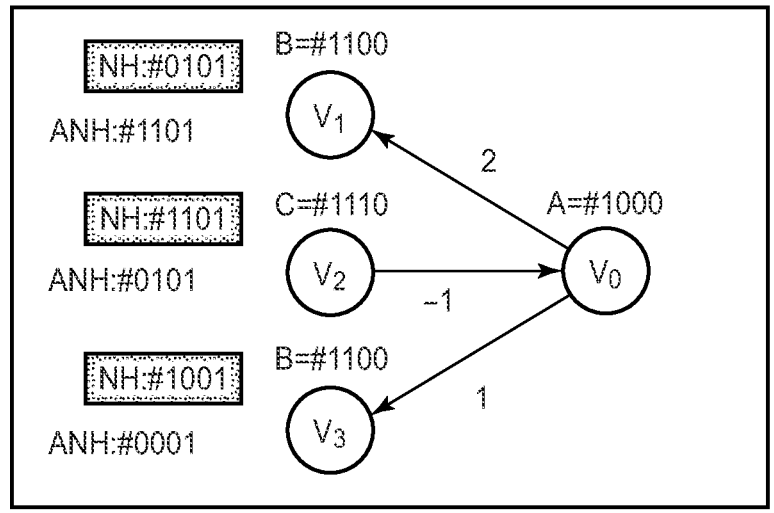
FIG. 8 is a diagram illustrating an example of a graph for which similarity calculation between nodes is performed according to one embodiment of the present invention.
Figure 8:
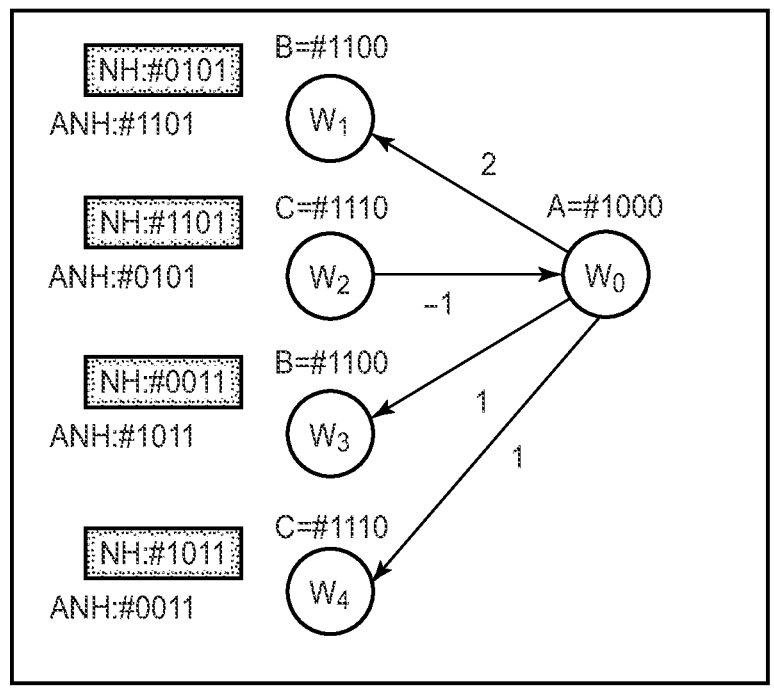

FIG. 8 illustrates an example of a graph for which similarity calculation between nodes is performed according to one embodiment of the present invention. It is assumed that nodes $v_0$ and $w_0$ are selected as target nodes for performing the similarity calculation in the graph illustrated in FIG. 8. A set (V) of the corrected new label values of the nodes $v_1$, $v_2$, and $v_3$ adjacent to the target node $v_0$ includes #1101, #0101, and #0001. A set (W) of the corrected new label values of the nodes $w_1$, $w_2$, $w_3$, and $w_4$ adjacent to the target node $w_0$ includes #1101, #0101, #1011, and #0011.

Therefore, the union of sets V and W results in five elements, #1101, #0101, #0001, #1011, and #0011, and the intersection of sets V and W results in two elements, #1101 and #0101. Therefore, the similarity (Jaccard coefficient J) between the target nodes $v_0$ and $w_0$ are calculated to be 0.4.

FIG. 9 illustrates an example of an advantageous effect of the application of one embodiment of the present invention. FIG. 9 presents an experimental result of a similarity evaluation in a protein network present in yeast (2361 nodes). The rows of "Mean similarity (all)," "Mean similarity (selected)," and "Mean rank (selected)" represent "similarity between all protein pairs," "mean similarity between known similar protein pairs," and "the average of similarity between similar protein pairs," respectively.

In FIG. 9, the approach described by using one embodiment of the present invention is compared with the following four approaches:

CoS(ID): Similarity is defined by the inner product of the vectors of the connected nodes (2361 dimensions).
CoS(label): Similarity is defined by the inner product of the vectors of the number of labels of the connected nodes (13 dimensions).
SimRank: Existing random walk based approach
AugmentedSimiRank: Existing random walk based approach with consideration of node labels In the comparison of the results, the following evaluation criterion can be used. First, if "the mean similarity between known similar protein pairs" is higher than "the similarity between all protein pairs," the similarity between the similar protein pairs is higher as an average value, and therefore the approach is excellent. Second, if "the average of similarity between similar protein pairs" is lower, the approach ranks high on the similarity between similar protein pairs, and therefore the approach is excellent.

These results demonstrate that the Cos(ID) approach is excellent according to the first evaluation criterion, but produced a poor result according to the second evaluation criterion. Moreover, the results demonstrate that other approaches (CoS(label), SimRank, and AugmentedSimRank) each produced a poor result according to both of the first and second evaluation criteria.

On the other hand, it is understood that the approach in this embodiment produced a result with stability according to both of the first and second evaluation criteria. Therefore, it is understood that an advantageous effect is achieved according to one embodiment of the present invention, such that the solution of the results is obtained within an appropriate computation time even for a large-sized graph of 2361 nodes.

Although the present invention has been described hereinabove with reference to the embodiments, various alterations or improvements can be added to the above embodiments, and it will be apparent to those skilled in the art that the embodiments where such alterations or improvements are incorporated can be included in the technical scope of the present invention. For example, while the specific processes illustrated in FIG. 5 or FIG. 6 have been described as a hash calculation of the label values illustrated in FIG. 4, these processes are merely illustrative of an embodiment and it is possible to use an arbitrary hash function requiring only an appropriate computational amount.

Moreover, the similarity calculation with the Jaccard coefficient used in one embodiment of the present invention is merely an embodiment. Those skilled in the art would conceive various variations on the basis of the new label values of the nodes adjacent to two target nodes. As another variation, if the calculation of the new label values of the respective nodes is repeated more than once, similarity between the target nodes may be calculated by determining an average, a weighted mean, or the like of a plurality of Jaccard coefficients calculated using new label values obtained by the repeated calculations.

What is claimed is:

1. A computer-implemented method for calculating similarity between nodes in one or more graphs which are displayable on a computer display, the method comprising the steps of:

correcting the new label value of the adjacent node to remove an influence of the label value of a target node with respect to each of the target nodes for the calculation of the similarity between the nodes; and calculating the similarity between the target nodes by using the corrected new label value of the node adjacent to one target node and the corrected new label value of the node adjacent to another target node;

wherein at least one of the steps is carried out by a computer device.

2. The method according to claim 1, wherein the calculation of the new label value includes performing a hash calculation of the label value of the adjacent node.

3. The method according to claim 2, wherein the performance of hash calculation includes calculating an XOR value of label values of a plurality of adjacent nodes, in the case of a presence of the plurality of adjacent nodes.

4. The method according to claim 2, wherein the performance of the hash calculation includes calculating an XOR between an XOR value of label values of a plurality of adjacent nodes, in the case of a presence of the plurality of adjacent nodes, and the label value of the node.

5. The method according to claim 4, wherein the correction includes calculating an XOR between each of the new label values of the nodes adjacent to the target node and the label value of the target node to remove an influence of the label value of the target node.

6. The method according to claim 1, wherein the calculation of the new label value includes converting the label value of the adjacent node by using a label value of an edge connected to the node.

7. The method according to claim 6, wherein the conversion includes performing a bit rotation of the label value of the adjacent node according to the label value of the edge connected to the node.

8. The method according to claim 7, wherein the conversion includes adding the label value of the edge connected to the node to the label value of the adjacent node.

9. The method according to claim 1, wherein the calculation of the similarity includes calculating a Jaccard coefficient by comparing the corrected new label value of the node adjacent to one target node with the corrected new label value of the node adjacent to another target node.

10. The method according to claim 1, wherein the calculation of the new label value includes replacing the label values of the nodes in one or more graphs with the new label values of the nodes and wherein the method further comprises repeating calculation of the new label value a predetermined number of times.

11. The method according to claim 1, wherein the label value is a discrete value.

12. The method according to claim 1, wherein the label value is a predetermined bit string.

13. The method according to claim 1, wherein the label value is a fixed-length bit string.

14. A non-transitory article of manufacture tangibly embodying computer readable instructions which, when implemented, cause a computer system to perform the steps of a computer-implemented method for calculating similarity between nodes in one or more graphs that are displayable on a computer display, the method comprising:

calculating a new label value of a node on the basis of a label value of at least one node adjacent to the node with respect to each of the nodes in one or more graphs, wherein the one or more graphs comprise graph data that are stored in a computer-readable data structure and the graph data includes the nodes in one or more graphs;

correcting the new label value of the adjacent node to remove an influence of the label value of a target node with respect to each of the target nodes for the calculation of the similarity between the nodes; and calculating the similarity between the two or more nodes by using the corrected new label value of the node adjacent to one target node and the corrected new label value of the node adjacent to another target node.

15. A computer-implemented system for calculating similarity between nodes in one or more graphs which are displayable on a computer display, the system comprising:

a graph data creation section for calculating a new label value of a node on the basis of a label value of a node adjacent to the node with respect to each of the nodes in one or more graphs, wherein the one or more graphs comprise graph data that are stored in a computer-readable data structure and the graph data includes the nodes in one or more graphs;

a label value correction section for correcting the new label value of the adjacent node to remove an influence of the label value of a target node with respect to each of the target nodes for the calculation of the similarity between the nodes; and a node similarity calculation section for calculating the similarity between the two or more nodes by using the corrected new label value of the node adjacent to one target node and the corrected new label value of the node adjacent to another target node.

* * * * *